March 20, 1934.    W. N. ROSEWAY    1,951,883
FOUR-WIRE TERMINATING SET
Filed Dec. 28, 1929    2 Sheets-Sheet 1

INVENTOR
W. N. ROSEWAY
BY H. A. Burgess
ATTORNEY

March 20, 1934.    W. N. ROSEWAY    1,951,883
FOUR-WIRE TERMINATING SET
Filed Dec. 28, 1929    2 Sheets-Sheet 2

INVENTOR
W. N. ROSEWAY
BY
ATTORNEY

Patented Mar. 20, 1934

1,951,883

UNITED STATES PATENT OFFICE 1,951,883

FOUR-WIRE TERMINATING SET

Walter N. Roseway, Hendon, London, England, assignor to Western Electric Company, Incorporated, New York, N. Y., a corporation of New York Application December 28, 1929, Serial No. 417,064
In Great Britain May 3, 1929

11 Claims. (Cl. 179—170)

This invention relates to signaling circuit arrangements with hybrid coils and more particularly to four wire terminating sets.

In arrangements of this kind in order to obtain efficient conjugate relationship between the two branches of the four wire circuit it is necessary to maintain a very high degree of balance between the coil windings. This is usually effected by arranging the hybrid coils in two pots or containers, the primary windings of the two wire line being in the form of a twisted pair of conductors wound on a core in series aiding relation. The secondary windings of the transmitting branch are wound about said primary windings on the same core. The primary windings of the receiving branch of the four wire circuit and the secondary windings of the two wire line bear to each other a similar relationship to that above described. By such an arrangement a good balance is obtained and the loss between the two wire line and the transmission branch of the four wire circuit is substantially constant over the entire transmission range and up to say 10 kc. This characteristic is sometimes undesirable in good quality or long distant circuits because transient distortion is thereby permitted to an objectionable extent.

An object of the present invention is to provide a hybrid coil circuit arrangement for coupling a four wire circuit to a two wire line wherein an accurate balance is obtained and which at the same time has a rising frequency-attenuation characteristic, by which the attenuation of the higher frequencies giving rise to transient distortion is appreciably increased.

In one embodiment of the invention additional inductance windings are serially connected to the line winding of the hybrid coil. In another arrangement each serially connected additional inductance winding is in two parts between which a condenser is situated.

From another aspect the invention provides a circuit arrangement comprising a hybrid coil to which additional inductances are introduced to resonate with the capacities existing between the line windings as hereinafter explained.

Figure 1:
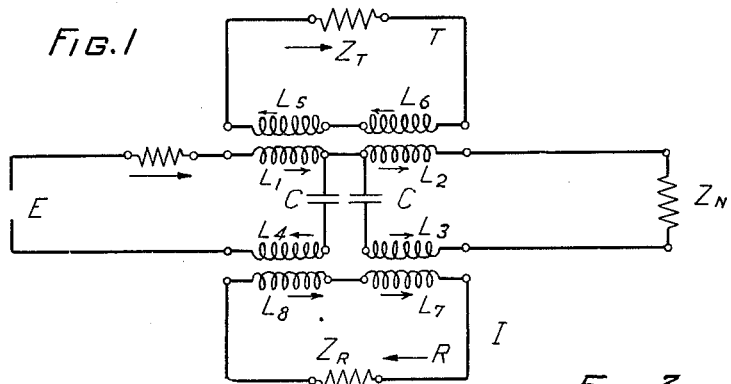
Figure 2:
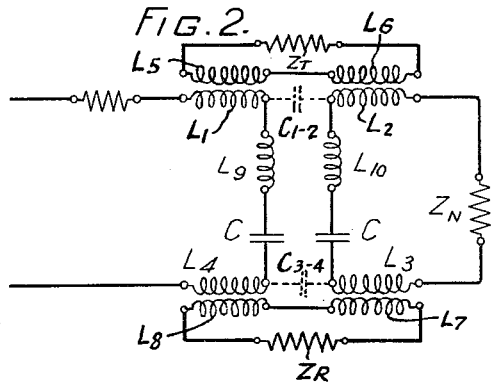
Figure 3:
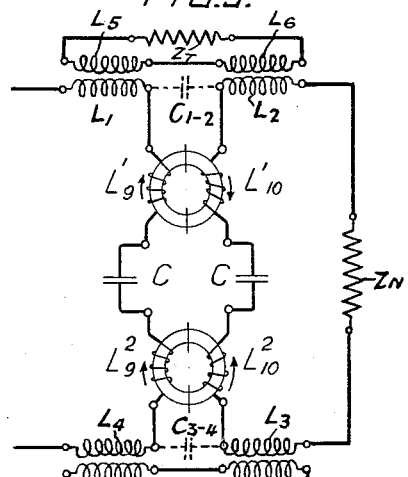
Figure 4:
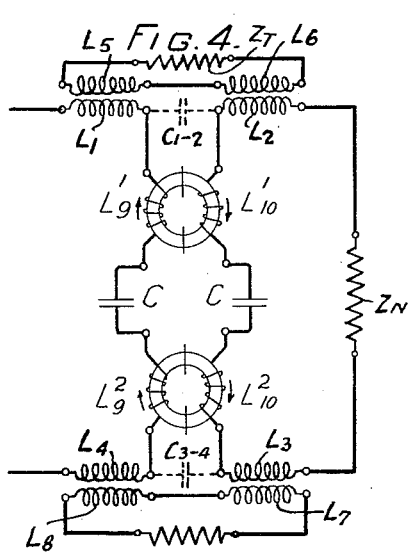
Figure 5:
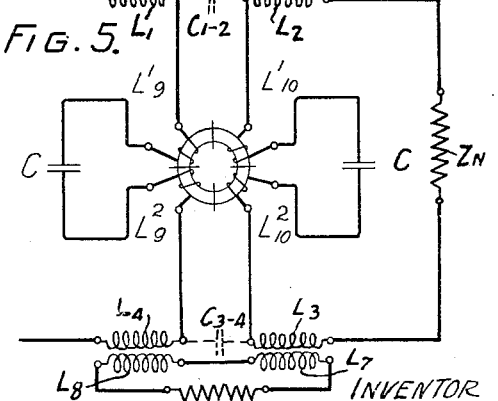

The invention will now be described in connection with the accompanying drawings, in which Fig. 1 is a diagram of a known form of four wire terminating set, Fig. 2 is a terminating set according to the present invention, Fig. 3 is a modified form of the terminating set according to the present invention, Fig. 4 is a further modified form, Fig. 5 is a modified form of the terminating set of Fig. 4, and Figs. 6, 7 and 8 give curves illustrating the attenuation-frequency characteristics of various terminating sets.

In the known arrangement of Fig. 1 the two wire line E is connected to the four wire line comprising branches T and R through a hybrid coil, which comprises primary windings $L_1$, $L_2$ and secondary windings $L_3$ and $L_4$, these four windings being connected in known manner to the line E and the balancing network $Z_T$. The windings $L_1$ and $L_2$ are series aiding whereas the windings $L_3$ and $L_4$ are series opposing. The condensers C are provided for the purpose of raising the lower cut-off of the line which is especially useful in composite working. Secondary windings $L_5$ and $L_6$, which are coupled to the windings $L_1$ and $L_2$ are situated in the transmitting branch T of the four wire circuit, the impedance of this branch circuit being represented by $Z_N$. Primary windings $L_7$ and $L_8$ coupled to the windings $L_3$ and $L_4$ are similarly situated in the receiving branch R of the four wire circuit. The impedance of the receiving branch is represented by $Z_R$. The hybrid coil is so balanced that the transmission branches T and R are in substantially conjugate relation. The windings $L_1$ and $L_2$ were in the known arrangement wound on the same toroidal core each occupying one-half thereof and the secondary windings $L_5$ and $L_6$ were superimposed above the two primary windings on the same core. In similar manner were disposed the windings $L_3$, $L_4$, $L_7$ and $L_8$ on another toroidal core. Signaling currents impressed from line E on the network in the direction of the arrow and transmitted to the branch circuit T were attenuated in accordance with the curve 1 of Fig. 6 when the hybrid coil was arranged in the manner above described. From this curve it is seen that the attenuation increases with frequency at a substantially steady rate. Owing to the fact that the primary windings on the common core could not be disposed thereabout with sufficient symmetry with respect to the core and to the superimposed secondary windings, it was practically impossible to obtain a proper balance which would provide efficient conjugate working between the branches of the four wire circuit.

In another arrangement the coils $L_1$ and $L_2$ were in the form of a pair of conductors twisted together and wound upon a toroidal core and by this method the symmetry in the geometrical disposition of the windings was attained. This arrangement of terminating network results in a frequency-attenuation curve between the two wire and four wire transmission branch of the form shown in curve 2 of Fig. 6. This curve shows that the attenuation is substantially constant with frequency. By employing a terminating network having this attenuation-frequency characteristic the result obtained is that the frequencies near the upper limit of the transmitted range are not attenuated to a degree which from a quality standpoint is sufficient to avoid unpleasant transient distortion, and in this respect it will be seen that the attenuation-frequency curve 3 for the terminating set using the first described arrangement is more suitable.

Figure 6:
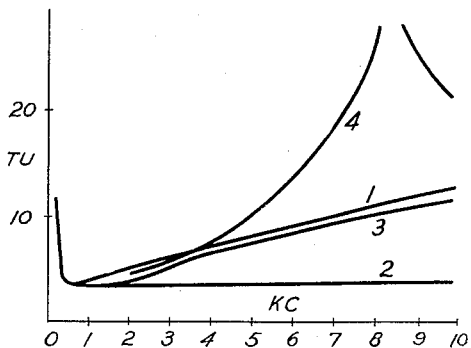
Figure 7:
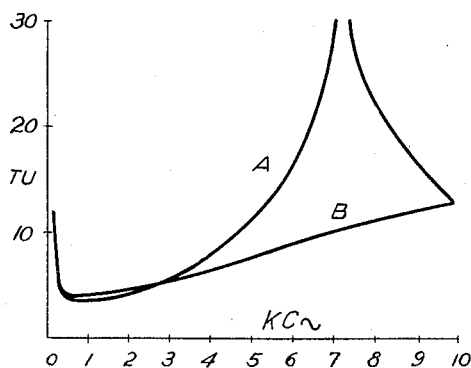

According to the present invention, however, a frequency-attenuation curve as shown at 4 in Fig. 6 may be obtained by an arrangement which is illustrated in Fig. 2. In this arrangement additional inductance windings $L_9$ and $L_{10}$ are connected in series with the windings $L_1$ and $L_4$ and $L_2$ and $L_3$ respectively. The values of $L_1$, $L_2$, $L_3$, $L_4$, $L_5$, $L_6$, $L_7$ and $L_8$ are determined in the normal manner for designing a hybrid coil circuit and to form a high pass filter with the capacity C. The values of $L_9$ and $L_{10}$ are so chosen with respect to the capacity between the line windings which is inherent in the system that the attenuation of the circuit increases rapidly at frequencies near the upper limit of the signal transmission band. The inductance $L_9$, it will be noted, forms with the inherent capacities $C_{1-2}$ and $C_{3-4}$ and any other capacities effectively across the inductance, an anti-resonant circuit in series with the two-wire circuit and the line windings associated therewith. In a particular instance where the required rise in loss from 1000 cycles per second to 5000 cycles per second was 10 decibels, it was found that the anti-resonant circuit just described was preferably to be tuned to approximately 7000 cycles per second. This required a value of $L_9$ of 0.048 henry for the circuit shown in Fig. 2.

In order to maintain bridge balance it is desirable to use the arrangement shown in Fig. 3. In this arrangement the additional inductive windings 9 and 10 are each split into two parts $L^1{}_9$ and $L^2{}_9$ and $L^1{}_{10}$ $L^2{}_{10}$ respectively, in between which parts the condensers C are situated as shown. The attenuation-frequency characteristic of the arrangement shown in Fig. 3 when $L^1{}_9$, $L^2{}_9$ and $L^1{}_{10}$ and $L^2{}_{10}$ were each equal to .024 henry is given in curve A of Fig. 7, this representing the loss between the two wire line and the four wire trasmission branch (T). Curve B represents the loss between the receiving branch of the four wire circuit and the two wire line. Therefore with a similar hybrid coil arrangement at the other end of the four wire circuit the total loss between the two wire lines is represented by the summation of curve A and B. It will be seen that the difference between the total loss at 1000 cycles and 5000 cycles is about 10 decibels which is the value required in the particular case. It must be observed in the arrangement of Fig. 3 that the windings $L^1{}_{10}$ and $L^2{}_{10}$ are in effect opposing with respect to signals induced from windings $L^1{}_9$ and $L^2{}_9$.

The arrangement of Fig. 4 is similar to that of Fig. 3 the only difference being that windings $L^1{}_{10}$ and $L^2{}_{10}$ are in effect aiding. This slightly alters the value of the inductance windings $L^1{}_9$, $L^2{}_9$ and $L^1{}_{10}$ and $L^2{}_{10}$ which however may be computed in the manner given above and by test. The attenuation-frequency curve of the arrangement shown in Fig. 4 is given in curve A in Fig. 8 for measurement between the two wire line and the four wire transmission branch. It will be seen that a very high attenuation is obtained for the upper frequencies and this for the above explained reasons is desirable. The attenuation-frequency curve representing the loss between the four wire receiving branch and the two wire line is represented by curve B in Fig. 8. It will be seen that this curve shows substantially constant attenuation over the entire frequency range. An arrangement as shown in Fig. 4, however, is of considerable value in four wire circuits where a similar hybrid coil arrangement is arranged at both ends thereof, since the transmitting branch at both ends of the four wire circuit may be so connected to the two wire line by means of an arrangement as shown in Fig. 4 that the loss between the two wire line and each branch is represented by a curve substantially as A in Fig. 8.

The arrangement of Fig. 4 lends itself very readily to the modification shown in Fig. 5 wherein all the additional inductance windings are mounted on a common core. Similar reference letters indicate like paths in Figs. 4 and 5.

Figure 8:
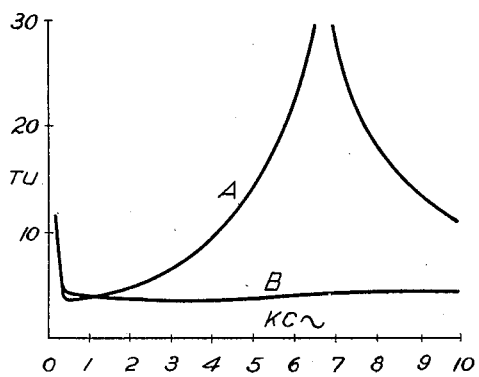

The attenuation-frequency curve of the arrangement shown in Fig. 5 is given in curves A and B of Fig. 8, curve A representing the loss between the two wire line and the four wire transmission branch and curve B representing the loss between the four wire receiving branch and the two wire line.

Although this invention has been described in connection with specific embodiments it is not to be understood as limited to these particular embodiments since numerous modifications thereof may be made by persons skilled in the art without departing from the spirit of applicant's invention, the scope of which is to be determined by the appended claims.

What is claimed is:

1. A signaling circuit arrangement comprising a hybrid coil and means to attenuate the higher frequencies applied thereto, said means comprising an inductance connecting windings of said hybrid coil in the two-wire line and resonating with the capacities existing between the two-wire line windings.

2. A hybrid transformer circuit for coupling a two-wire circuit, a four-wire circuit, and a balancing network, said transformer circuit including means to limit the range of frequencies transmitted, said means comprising windings connected to said two-wire line, windings connected to said balancing network and an anti-resonant circuit in series in said two-wire line for suppressing waves above the range of signaling frequencies, said anti-resonant circuit including as a series element thereof the inherent capacity between said two-wire line windings and said balancing network windings.

3. In a signaling circuit, a hybrid coil system, a two-wire circuit connected to the line windings thereof, input and output circuits coupled only inductively to said line windings, an internal connection between said line windings for completing said two-wire circuit through said windings, and an inductor in series in said connection for increasing the attenuation at high frequencies.

4. A signaling system comprising line, balancing, input and output circuits, a transformer system providing inductive coupling only between said circuits, a plurality of transformer windings associated with one of said circuits, an internal connection between said windings completing said associated circuit through said windings, and inductance in series in said connection comprising an anti-resonant circuit determining the upper frequency limit of the transmission band.

5. In a signaling circuit, a hybrid coil system, a two-wire circuit connected to the line windings thereof, a connection between said line windings for completing said two-wire circuit through said windings, and capacitive and inductive elements connected in series in said connection and in balanced relation with respect to said two-wire circuit, said elements determining the lower and upper limits, respectively, of the range of signaling frequencies transmitted.

6. A transformer system for coupling a two-wire system and a four-wire system, comprising a plurality of transformer windings connected to said two-wire system, a balancing circuit, a plurality of transformer windings connected to said balancing circuit, and additional inductance windings connected in series in said two-wire system and said balancing circuit, respectively, each of said inductance windings being formed in two parts between which parts a condenser is connected, one part of each of said additional windings being wound on a common core.

7. A combination in accordance with claim 6, in which said additional windings are so poled as to couple said balancing circuit with said two-wire system.

8. A combination in accordance with claim 6, in which said additional windings are so poled that signals in said two-wire system create mutually opposing voltages in the parts of said additional windings connected in said balancing circuit.

9. A signaling circuit arrangement comprising a hybrid coil having two-wire line windings and four-wire line windings, said two-wire line windings having serially connected therewith an additional inductance winding, a balancing circuit, an additional inductance winding serially connected therewith, each of said inductance windings being formed in two parts between which parts a condenser is connected, and both of said inductance windings being wound on a common core.

10. A combination for coupling a four-wire signaling system to a two-wire signaling system comprising two transformers having each a plurality of windings, said two-wire system including in series a winding of one of said transformers, an inductor, and a winding on the other of said transformers in the order named, said combination tending to suppress transmission above the range of signaling frequencies.

11. A combination for coupling a four-wire and a two-wire system comprising two multi-winding transformers, said two-wire circuit including a winding on each of said transformers, a connection between said windings for completing said two-wire circuit therethrough, a series condenser in said connection determining the low frequency transmission cut-off of said combination, and an inductance in said connection for determining the high frequency cut-off of said combination.

WALTER N. ROSEWAY.